Patented Sept. 22, 1942

2,296,337

UNITED STATES PATENT OFFICE 2,296,337

COATING COMPOSITION

John Seneca Cummings, Brooklyn, N. Y., assignor to Interchemical Corporation, New York, N. Y., a corporation of Ohio No Drawing. Application November 8, 1938, Serial No. 239,508

5 Claims. (Cl. 106—195)

This invention relates to coating compositions, and has particular reference to new and novel coating compositions comprising solutions of a plurality of compatible film-forming solids dissolved in solvents in such proportion as to yield "blushed" films comprising discrete particles embedded in a matrix of, and protected by, a clear glossy film.

The phenomenon of "blushing" is one well known to the coating industry. While unpigmented coating compositions which dry by evaporation of solvent (lacquers) generally dry down to smooth homogeneous transparent films, it is possible to produce non-homogeneous films by disturbing the solvent balance so that the binder is insoluble in the solvent during some portion of the film-forming operation, and remains insoluble thereafter. In such cases, the binder precipitates out in the form of very small discrete particles of transparent material, with air between the particles; the resultant film is translucent or opaque, appears white to the eye and is generally matte. Nitrocellulose, other cellulose derivatives and resins all can be made to yield such films, either by proper choice of organic solvents, or by judicious use of water in the film; the methods of producing such films are well known in the art; largely because a knowledge of the conditions which favor blushing permit formulators to avoid this generally undesirable phenomenon. This type of matte translucent opaque white film has heretofore been used to coat cloth and paper, to produce tracing cloth.

In my co-pending application, Serial Number 75,570, filed April 21, 1936, I have disclosed the possibility of controlling the solvent balance in such compositions so that the film deposited during the early stages of drying is clear and transparent, while the film deposited in the late stages is blushed and opaque, whereby a blushed film is obtained enclosed in a glossy envelope, yielding a glossy opaque finish for paper and the like. As disclosed in my co-pending application, Serial No. 75,570, when cellulose derivatives are employed the lacquer cannot contain over 20% of solvent plasticizer, based on the cellulose derivative, or the blush is lost. As a result, optimum strength and flexibility in the clear film forming the matrix and envelope cannot be obtained, since lacquers containing solvent plasticizers yield the best films.

I have now discovered that if at least two kinds of film forming cellulose derivatives or resins are employed in a lacquer, together with solvents which cause a blush with at least one of the film forming derivatives, a film can be obtained which consists of discrete particles bound by and enveloped in a glossy envelope; and I have discovered that the clear envelope can be advantageously formulated with a solvent plasticizer for the film forming material comprising the clear envelope even in amounts which would completely prevent the formation of a blush in the film forming material, provided it does not substantially dissolve the precipitated material, whereby the properties of the clear envelope may be improved to any desired point, while retaining the discrete particles unchanged, so that films of greatly improved flexibility and resistance to mechanical action can be obtained, together with the unusual whiteness characteristic of fully blushed films.

Substantially any combination of two or more cellulose derivatives and film forming resins may be used, provided the solvents are chosen so as to be unbalanced as to at least one of the materials and balanced as to one of the others, and the plasticizers used are substantially non-solvent as to the materials as to which the solvents are unbalanced. Typical examples of my invention are the following:

*Example I*

| | Parts by weight |
|---|---|
| Cellulose acetate (2-6 seconds viscosity) | 12.0 |
| ½ second RS nitrocellulose (wet with 30% denatured alcohol) | 6.0 |
| Acetone | 34.5 |
| Ethyl alcohol | 30.5 |
| Methyl abietate | 9.0 |
| Dibutyl phthalate | 4.0 |

This lacquer is a clear liquid, since the solvent mixture dissolves both the cellulose acetate and the cellulose nitrate. On coating a surface, however, the acetone evaporates first, leaving a mixture progressively stronger in alcohol and plasticizer, the dibutyl phthalate being a solvent plasticizer for nitrocellulose and a non-solvent for cellulose acetate, while the methyl abietate is a resinous non-solvent plasticizer for nitrocellulose. As a result, the cellulose acetate precipitates as discrete particles to produce a very strong blush; the nitrocellulose deposits about and above the discrete particles to produce a clear glossy film which is flexible and strong.

*Example II*

A very good blush can be obtained, together with somewhat improved film properties, by reducing the amount of precipitated material, Such a lacquer, possessing excellent film properties together with satisfactory opacity and color, can be made from the following ingredients:

| | Parts by weight |
|---|---|
| Cellulose acetate of Example I | 5 |
| Acetone | 43 |
| Denatured alcohol | 34 |
| 40 seconds AS nitrocellulose (wet with 30% denatured alcohol) | 15 |
| Tricresyl phosphate | 3 |

*Example III*

A lacquer which produces a flexible dense white film when applied to coated cloth is the following:

| | Parts by weight |
|---|---|
| Cellulose acetate | 3 |
| Acetone | 58 |
| 40 seconds AS Nitrocellulose (wet) | 6 |
| Dibutyl phthalate | 4 |
| Denatured alcohol | 29 |

*Example IV*

| | Parts by weight |
|---|---|
| ½ sec. RS nitrocellulose (wet with 30% ethyl alcohol) | 14.3 |
| 6 sec. ethyl cellulose | 5.0 |
| Ethyl acetate | 42.2 |
| V. M. & P. Naphtha | 37.5 |
| Cotton seed oil | 1.0 |

This lacquer utilizes ethyl cellulose plasticized with cotton seed oil as the continuous film, and nitrocellulose to produce the discrete particles. This film is unusually tough because of the good film properties of ethyl cellulose.

I have also used various other combinations of cellulose derivatives and combinations of cellulose derivatives with resins such as polymerized vinyl esters, and the phenomenon is generic wherever a solvent combination can be found which dissolves both and is unbalanced as to one. When resins are used in combination with cellulose derivatives, care must be taken that the materials are not mutually soluble, since some resins will dissolve nitrocellulose. In general, I prefer to use combinations of cellulose derivatives because of their lower cost and their superior film properties.

It is essential that sufficient binder be present to obtain a glossy film, if desirable results are to be obtained. In general, the clear film forming constituents should comprise at least 25% of the weight of the finished film. Similarly, while any precipitated cellulose derivative in the film produces a noticeable whitening of the film, a dense blush is not obtainable if the precipitated cellulose derivative is substantially below about 15% of the film weight.

Solvents may be chosen in known manner to give the desired speed of dry, and so as to be unbalanced as to one of the ingredients; while any plasticizers, resins or cellulose derivatives may be used in the continuous film so long as they are not solvents for the precipitated constituent.

The lacquers may be colored as desired, in known manner; the colors obtained are tints of the colors added, because of the whitening action of the blushed film.

Various changes in proportions can obviously be made without departing from the scope of my invention, which is defined in the claims.

I claim:

1. A lacquer comprising two solvent-soluble film-forming cellulose derivatives of the class consisting of cellulose esters and cellulose ethers dissolved in a solvent mixture capable of dissolving both cellulose derivatives, and consisting of rapidly evaporating solvent for both cellulose derivatives and such substantial quantities of additional solvent which dissolves only one of them, and evaporates at a substantially lower rate than the rapidly evaporating solvent that the solvent is unbalanced as to one of the cellulose derivatives and balanced as to the other, the ingredients being so proportioned that on drying, the cellulose derivative as to which the solvent is unbalanced and which comprises at least 15% of the film, precipitates during the early stages of drying as discrete particles, and the second cellulose derivative as to which the solvent is balanced, and which comprises at least 25% of the film, forms a glossy continuous film in which the precipitate is embedded to give opacity to the film.

2. The lacquer of claim 1 in which the precipitating cellulose derivative is cellulose acetate, and the second cellulose derivative is nitrocellulose.

3. The lacquer of claim 1 in which the precipitating cellulose derivative is nitrocellulose and the second cellulose derivative is ethyl cellulose.

4. An article comprising a base carrying a highly glossy opaque film consisting a a continuous glossy film of a solvent-soluble cellulose derivative of the class consisting of cellulose esters and cellulose ethers comprising at least 25% by weight of the total film, having embedded therein, under the surface of the continuous film, discrete particles of another solvent-soluble cellulose derivative comprising at least 15% by weight of the total film.

5. The article of claim 4 in which the continuous glossy film is nitrocellulose and a solvent plasticizer which is not a solvent for cellulose acetate, and the discrete particles are cellulose acetate.

JOHN SENECA CUMMINGS.